United States Patent
Cho et al.

(10) Patent No.: US 10,429,967 B2
(45) Date of Patent: Oct. 1, 2019

(54) IN-CELL TOUCH TYPE LIQUID CRYSTAL DISPLAY DEVICE AND METHOD FOR DRIVING THE SAME

(71) Applicant: LG Display Co., Ltd., Seoul (KR)

(72) Inventors: SeongHo Cho, Gyeongsangbuk-do (KR); CheonKee Shin, Gyeongsangbuk-do (KR); KyungSeok Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 426 days.

(21) Appl. No.: 13/727,780

(22) Filed: Dec. 27, 2012

(65) Prior Publication Data

US 2013/0314343 A1 Nov. 28, 2013

(30) Foreign Application Priority Data

May 24, 2012 (KR) .......................... 10-2012-0055657

(51) Int. Cl.
 *G06F 3/041* (2006.01)
 *G06F 3/044* (2006.01)
 *G02F 1/1333* (2006.01)

(52) U.S. Cl.
 CPC ............ *G06F 3/0412* (2013.01); *G06F 3/044* (2013.01); *G06F 3/0416* (2013.01); *G02F 1/13338* (2013.01)

(58) Field of Classification Search
 CPC ....... G06F 3/044; G06F 3/0412; G06F 3/0416
 (Continued)

(56) References Cited

U.S. PATENT DOCUMENTS 6,489,941 B1 * 12/2002 Inage et al. ................ 345/98
2007/0182719 A1 8/2007 Lee et al.
(Continued)

FOREIGN PATENT DOCUMENTS

CN 102455536 A 5/2012
EP 2 214 084 A1 8/2010
(Continued)

OTHER PUBLICATIONS

Notice of Allowance dated Aug. 29, 2014, issued by the Korean Intellectual Property Office in Korean Patent Application No. 10-2012-0055657.
(Continued)

*Primary Examiner* — Kwin Xie
(74) *Attorney, Agent, or Firm* — Morgan, Lewis & Bockius LLP

(57) ABSTRACT

The present disclosure relates to a liquid crystal display (LCD) device, and particularly, to an in-cell touch type LCD device, and a method for driving capable of preventing deterioration of picture quality and enhancing touch sensitivity, by dividing a touch block in a spatial manner, not in a time manner.

The in-cell touch type liquid crystal display (LCD) device, includes: an LCD panel including a first touch block and a second touch block having a plurality of gate lines and common lines; a gate driver for applying high-potential gate driving signals to the gate lines of the first touch block; a common voltage generator for supplying common voltages (Vcom) of first and second waveforms, to the common lines of the first and second touch blocks, respectively; and a touch detection circuit for detecting a touched position on the LCD panel through the second waveform common voltages.

8 Claims, 7 Drawing Sheets

(58) Field of Classification Search
USPC .................................................. 345/173–174
See application file for complete search history.

(56) References Cited

U.S. PATENT DOCUMENTS

| | | | |
|---|---|---|---|
| 2009/0002312 A1 | 1/2009 | Son | |
| 2009/0303193 A1 | 12/2009 | Lim et al. | |
| 2010/0194697 A1 | 8/2010 | Hotelling et al. | |
| 2010/0194707 A1* | 8/2010 | Hotelling et al. | 345/173 |
| 2011/0169741 A1 | 7/2011 | Guthrie | |
| 2011/0169747 A1* | 7/2011 | Chen et al. | 345/173 |
| 2011/0267293 A1* | 11/2011 | Noguchi | G06F 3/0416 345/173 |
| 2011/0267295 A1 | 11/2011 | Noguchi et al. | |
| 2011/0298727 A1 | 12/2011 | Yousefpor et al. | |
| 2012/0068961 A1* | 3/2012 | Mizuhashi | G06F 3/0412 345/174 |
| 2012/0075240 A1* | 3/2012 | Kida | G06F 3/044 345/174 |
| 2012/0105752 A1 | 5/2012 | Park et al. | |
| 2012/0162133 A1* | 6/2012 | Chen et al. | 345/174 |
| 2013/0188104 A1 | 7/2013 | Aoki et al. | |

FOREIGN PATENT DOCUMENTS

| | | |
|---|---|---|
| EP | 2 428 878 A2 | 3/2012 |
| JP | 2007-200336 A | 8/2007 |
| JP | 2009-301545 A | 12/2009 |
| JP | 2012-073465 A | 4/2012 |
| JP | 2012-159817 A | 8/2012 |
| JP | 2013152291 A | 8/2013 |
| KR | 10-2009-0000484 A | 1/2009 |
| KR | 10-2012-0033238 A | 4/2012 |
| KR | 10-2012-0045992 A | 5/2012 |
| KR | 1020130086314 A | 8/2013 |

OTHER PUBLICATIONS

Office Action dated Feb. 21, 2014, issued by the Korean Intellectual Property Office in Korean Patent Application No. 10-2012-0055657.

United Kingdom Patent Office Combined Search and Examination Report (Application No. GB1223356.5) dated Jul. 22, 2013.

Notice of Allowance dated May 20, 2014, issued by the Japan Intellectual Property Office in Japanese Patent Application No. 2012-279171.

Office Action dated Jan. 28, 2014, by the Japan Intellectual Property Office in Japanese Patent Application No. 2012-279171.

Chinese Office Action dated May 20, 2015, in Chinese Patent Application No. 201210579980.6.

\* cited by examiner

IN-CELL TOUCH TYPE LIQUID CRYSTAL DISPLAY DEVICE AND METHOD FOR DRIVING THE SAME

This application claims priority to Korean Patent Application No. 10-2012-0055657, filed on May 24, 2012, which is incorporated by reference herein in its entirety

BACKGROUND OF THE INVENTION

1. Field of the Invention

The present disclosure relates to a liquid crystal display (LCD) device, and particularly, to an in-cell touch type LCD device and a method for driving the same, the method capable of preventing deterioration of picture quality and enhancing touch sensitivity, by dividing a touch block in a spatial manner, not in a time manner.

2. Background of the Invention

A liquid crystal display (LCD) device includes a display panel for displaying images by driving switching devices formed at intersections between a plurality of data lines and gate lines, driving ICs for controlling the display panel, and an additional optical source such as a backlight unit.

Especially, an LCD device applied to a mobile device is provided with a touch panel for touching a screen using a finger or a stylus pen, etc. rather than a general interface device such as a keyboard and a remote controller, so as to select a specific object or region on the screen.

Such touch panel has a structure where a touch panel additionally fabricated from a display panel is attached to an LCD panel, an in-cell touch structure where a touch electrode and lines are directly formed on a substrate of an LCD panel thus to implement a single panel, etc. An in-cell touch type LCD device is being spotlighted due to high sensitivity, simplified fabrication processes, etc.

The in-cell touch type LCD device should include a plurality of touch blocks for sensing a touch input, and sensing lines electrically connected to the touch blocks, as well as gate lines and data lines.

FIG. 1 is a view of the conventional in-cell touch type liquid crystal display (LCD) device.

The in-cell touch type LCD device includes gate lines (GL) and data lines (DL) which define a plurality of pixels on a substrate 10 by crossing each other, and common lines (CL) for applying common voltages (Vcom) to pixels. A driver 20 electrically connected to the respective lines is mounted to one side of the substrate. And, sensing lines (not shown) formed of low-resistance metallic material are formed on layers different from layers where the gate lines (GL) and the data lines (DL) are formed. The sensing lines are configured to transmit information on a touched position to a touch sensing circuit. The touched position is represented as coordinates values of X and Y axes. Therefore, the sensing lines include X-sensing lines extending in an X-direction, and Y-sensing lines extending in a Y-direction.

A touch block (TB) is formed on an entire display region of the substrate 10. The touch block senses a minute capacitance change occurring when a user touches the substrate using a touch pen or a finger, and converts the sensed capacitance change into a current. Then, the touch block transmits the current to the touch sensing circuit through the aforementioned sensing lines. A single touch block (TB) occupies an area corresponding to 40 gate lines, and the touch blocks (TB) may be formed in about 20 in number {TB0~TBn(n=19)}.

A terminal portion 30 is implemented as a flexible substrate, and transmitting and receiving each type of signals by being electrically connected to an external system, is provided at one side end of the LCD panel 10.

Under such structure, once the touch block (TB) is touched, a capacitance change generated from a pixel electrode and a common electrode is transmitted to the touch sensing circuit through the sensing lines. As a result, a touched position is sensed. To this end, a common voltage (Vcom) should be applied to the common electrode. Here, the common voltage (Vcom) alternatively implements a direct current (DC) waveform having a fixed potential in correspondence to a pixel voltage, and a sensing waveform configured to sense a touch input and performing a swing operation at prescribed time intervals.

If the sensing waveform common voltage and the pixel voltage are simultaneously applied to the common electrode and the pixel electrode, respectively, the two voltages simultaneously change, thereby causing a difficulty in sensing a touch input.

For instance, if a user touches a region on an LCD panel corresponding to a first touch block (TB0), and if gate driving signals are applied to gate lines (GL) of the first touch block (TB0), a potential of the pixel voltage greatly changes. At the same time, if the sensing waveform common voltage (Vcom) is applied to the first touch block (TB0), the corresponding sensing lines cannot precisely sense a touch input. Therefore, the conventional in-cell touch type LCD device is driven as the touch block is time-divided into a touch time period and a display time period.

FIG. 2 is a view showing signal waveforms implemented when driving the conventional in-cell touch type LCD device.

Referring to FIG. 2, the in-cell touch type LCD device is operated as the touch block is time-divided into a touch time period and a display time period, for a single time period of a horizontal synchronization signal (Hsync) which defines a single horizontal time period (1H). That is, for the single horizontal time period (1H), a sensing waveform common voltage (Vcom) which swings in an alternating current (AC) waveform is firstly allocated to the LCD device, and then a high-potential gate driving signal (VG) is allocated to the LCD device. At the same time, the common voltage (Vcom) is converted into a direct current (DC) waveform. Therefore, the high-potential gate driving signal (VG) and the touch waveform common voltage (Vcom) do not overlap each other.

However, the conventional in-cell touch type LCD device may have the following problems.

Firstly, as the two signals are applied to the LCD device in a time-division manner for the limited single horizontal time period, the time period for which the signals are applied is reduced to about the half. As an example, in case of an LCD device having a single horizontal time period (1H) of 20 us, a touch time period is 8 us, and a display time period is 12 us. Accordingly, the display time period is reduced by about 40% when compared with that of the existing LCD device. This may cause a difficult in obtaining a sufficient time to charge a pixel voltage, thereby resulting in deterioration such as cross-talk.

Secondly, touch sensitivity may be lowered due to a short touch time period.

Thirdly, since the touch time period and the display time period are alternately allocated per horizontal line, a gate overlap driving method for overlapping gate driving signals between neighboring gate lines so as to obtain a sufficient time to charge a pixel voltage, cannot be applied to the LCD device.

SUMMARY OF THE INVENTION

Therefore, an aspect of the detailed description is to provide a method for driving an in-cell touch type liquid crystal display (LCD) device, capable of reducing deterioration of picture quality resulting from an insufficient time for charging a pixel voltage when time-dividing a horizontal time period into a touch time period and a display time period.

Therefore, an aspect of the detailed description is to provide a method for driving an in-cell touch type liquid crystal display (LCD) device, the method applied with a gate overlap driving method for overlapping gate driving signals between neighboring gate lines so as to obtain a sufficient time for charging a pixel voltage charging time.

In various embodiments, an in-cell touch type liquid crystal display (LCD) device is provided, which may include: an LCD panel including a first touch block and a second touch block having a plurality of gate lines and common lines; a gate driver for applying high-potential gate driving signals to the gate lines of the first touch block; a common voltage generator for supplying common voltages (Vcom) of a first waveform to common lines of the first touch block, and at least partially at the same time, a second waveform to common lines of the second touch block; and a touch detection circuit for detecting a touched position on the LC panel through the second waveform common voltages.

In various embodiments, the first waveform common voltage may be a direct current (DC) common voltage corresponding to a pixel voltage of a pixel provided at the LC panel.

In various embodiments, the second waveform common voltage may be an alternating current (AC) common voltage sensed by the touch block, which second waveform common voltage swings at constant intervals.

In various embodiments, the high-potential gate driving signal and the second waveform common voltage may have a time period of at least 70% of a single horizontal time period (1H).

In various embodiments, the high-potential gate driving signal has a time period more than 2 horizontal time periods (2H), and an $n^{th}$ high-potential gate driving signal and an $n+1^{th}$ high-potential gate driving signal overlap each other for the single horizontal time period (1H).

In various embodiments, a method for driving an in-cell touch type liquid crystal display (LCD) device including an LCD panel having first and second touch blocks is provided. The method may include: applying high-potential gate driving signals to gate lines of the first touch block; and at least partially at the same time applying common voltages (Vcom) of a first waveform and a second waveform, to the common lines of the first and second touch blocks, respectively.

In various embodiments, the first waveform common voltage may be a direct current (DC) common voltage corresponding to a pixel voltage of a pixel provided at the LC panel.

In various embodiments, the second waveform common voltage may be an alternating current (AC) common voltage sensed by the touch block, which second waveform common voltage swings at constant intervals.

In various embodiments, the high-potential gate driving signal and the second waveform common voltage may have a time period of at least 70% of a single horizontal time period (1H).

In various embodiments, the high-potential gate driving signal may have a time period more than 2 horizontal time periods (2H), and an $n^{th}$ high-potential gate driving signal and an $n+1^{th}$ high-potential gate driving signal overlap each other for the single horizontal time period (1H).

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
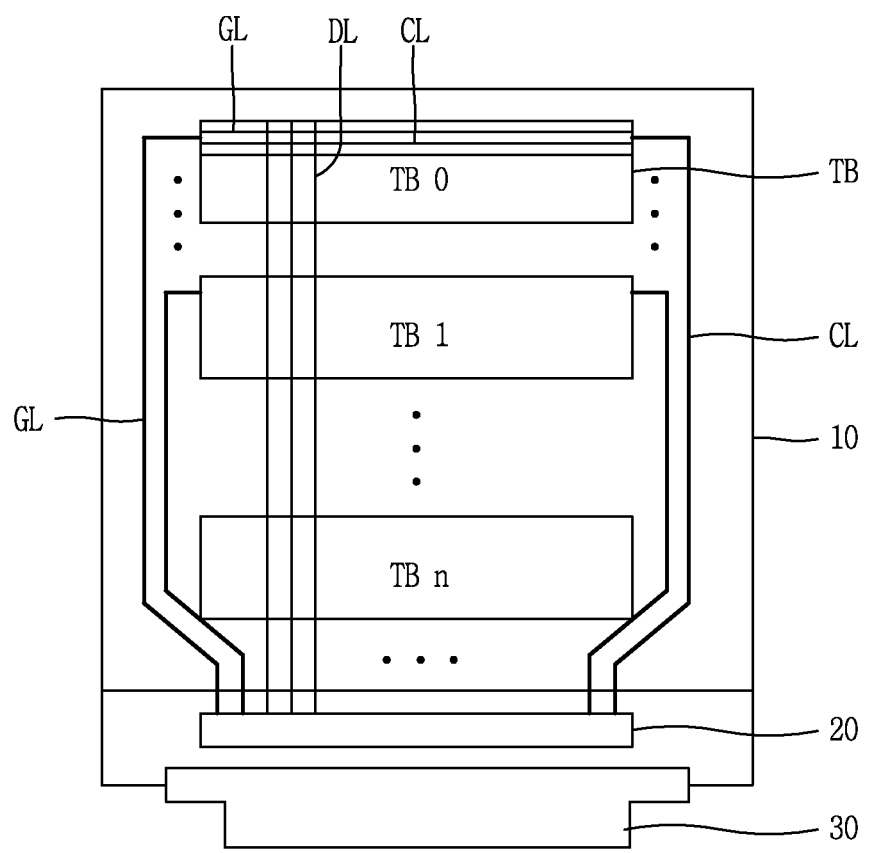
FIG. 1 is a view of an in-cell touch type liquid crystal display (LCD) device in accordance with the conventional art.
Figure 2:
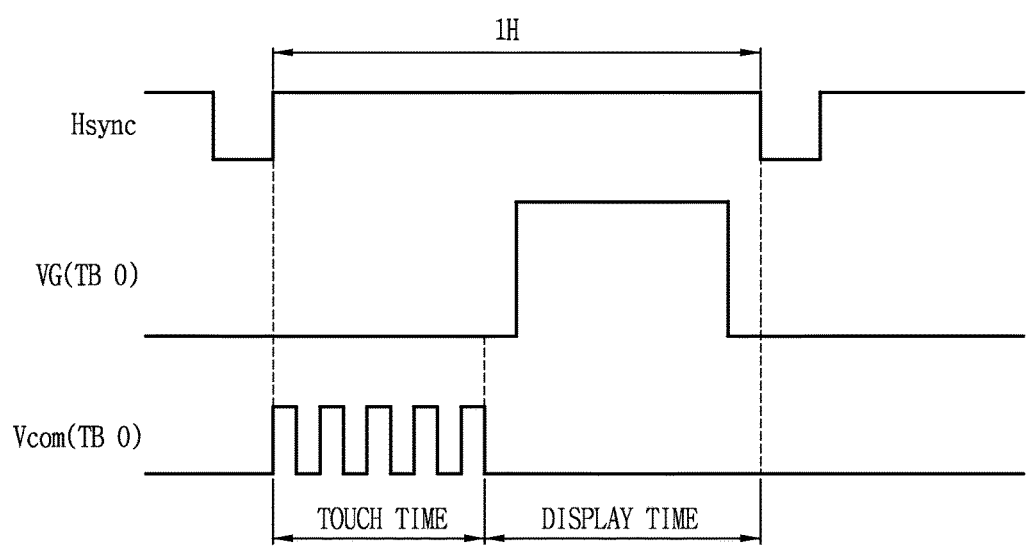
FIG. 2 is a view showing signal waveforms implemented when driving an in-cell touch type LCD device in accordance with the conventional art.
Figure 3:
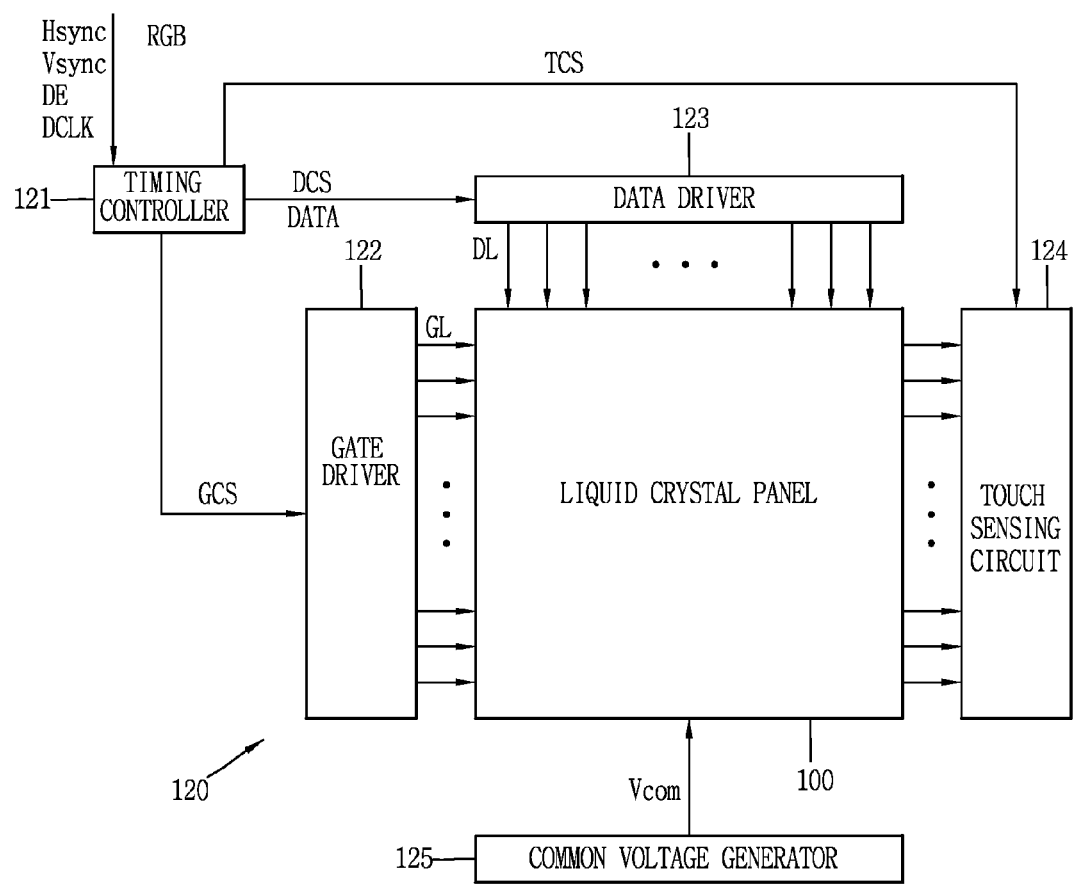
FIGS. 3 and 4 are views showing a structure of an LCD device according to the present invention.
Figure 4:
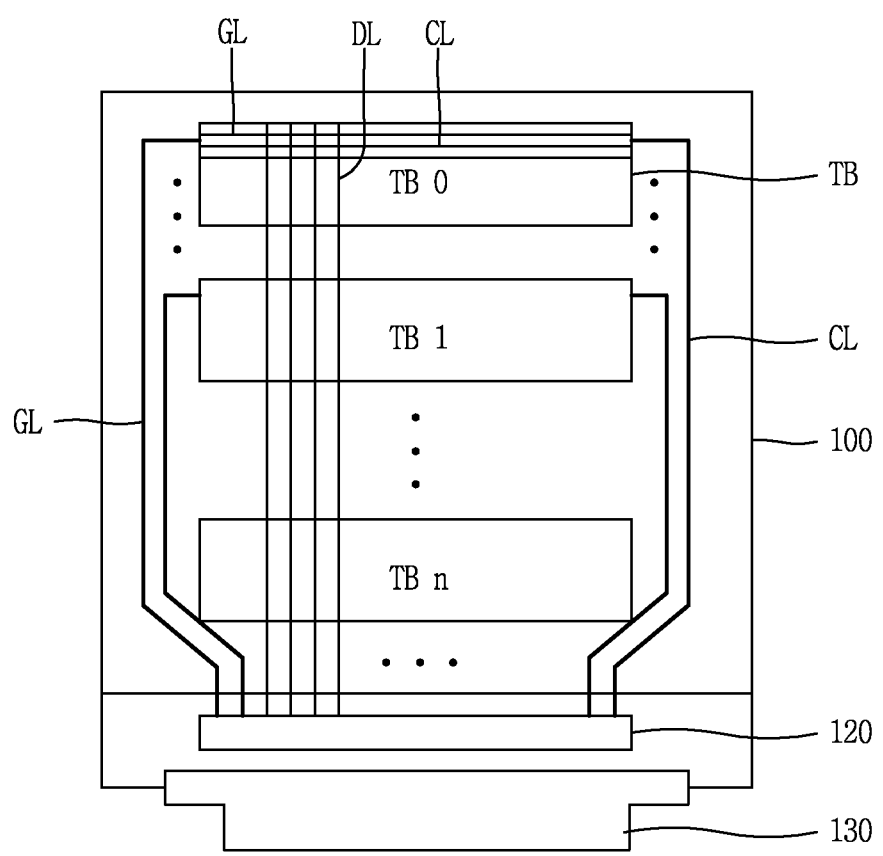

Hereinafter, an in-cell touch type liquid crystal display (LCD) device and a method for driving the same according to the present invention will be explained in more details FIGS. 3 and 4 are views showing a structure of an LCD device according to the present invention.

As shown, the LCD device of the present invention includes an LCD panel 100 for displaying an image, and a each type of driving circuit 120 for controlling the LCD panel 100, and sensing a touch input applied to one or more regions on a screen.

More specifically, the in-cell touch type LCD device includes an LCD panel 100 which defines pixels formed at intersections between a plurality of gate lines (GL) and data lines (DL), a timing controller 121 for controlling a driver by receiving a timing signal and an image signal (RGB) from an external system (not shown), a gate driver 121 and a data driver 123 for driving the LCD panel 100 through the gate lines (GL) and the data lines (DL), a touch sensing circuit 124 for sensing a position touched by a user on the LCD panel 100, and a common voltage generator 125 for supplying a common voltage (Vcom) to the LCD panel 100.

The plurality of gate lines (GL) and plurality of data lines (DL) crossing the gate lines (GL) are formed in a matrix type on the LCD panel 100 implemented as a transparent substrate. And, a plurality of pixel regions are defined at the intersections between the gate lines and the data lines. A transistor, e.g. a field effect transistor, e.g. a thin film transistor (TFT) is formed at each pixel region, and an image is displayed on a screen as an LCD cell is driven under control of the TFT.

The TFT is turned on when a scan signal from the gate lines (GL), i.e., a high-potential gate driving voltage (VG) is applied thereto, thereby transmitting a pixel voltage applied from the data lines (DL) to the LCD cell. On the contrary, the TFT is turned off when a gate driving voltage (VG) of a low potential is applied thereto from the gate lines (GL), thereby maintaining a pixel voltage charged at the LCD cell during a single frame.

The LC cell, a capacitor is implemented as a pixel electrode and a common electrode face each other, which includes a common electrode connected to a common line and a pixel electrode connected to a drain electrode of the TFT. And, the LC cell may be further connected to a storage capacitor for stably maintaining a charged pixel voltage until the next frame. As an aligned state of a liquid crystal changes according to an electric field formed by a pixel voltage charged through the TFT, and a common voltage applied to the common electrode, optical transmittance of the LC cell is controlled. As a result, the pixel implements a gray scale.

Sensing lines (not shown) formed of low-resistance metallic material are formed on layers on the LCD panel 100, the layers different from layers where the gate lines and the data lines are formed. Such sensing lines include X-sensing lines extending in an X-direction and transmitting information on a touched position to the touch sensing circuit, and Y-sensing lines extending in a Y-direction.

A touch block (TB) is formed on an entire display region of the LCD panel 100. The touch block senses a minute capacitance change occurring when a user touches the LCD panel using a touch pen or a finger, and converts the sensed capacitance change into a current form. Then, the touch block transmits the current to the touch sensing circuit 124 through the aforementioned sensing lines. A single touch block (TB) occupies an area corresponding to 40 horizontal lines, and the touch blocks (TB) may be formed in about 20 in number {TB0~TBn(n=19)}. However, the present invention is not limited to this.

The timing controller 121 generates the aforementioned gate control signal (GCS) and data control signal (DCS) by receiving image data (DATA) applied from an external system (not shown), and a timing signal such as a clock signal (DCLK), a horizontal synchronization signal (Hsync) and a vertical synchronization signal (Vsync).

The horizontal synchronization signal (Hsync) indicates time taken to display a single horizontal line on a screen, and the vertical synchronization signal (Vsync) indicates time taken to display the entire screen (a screen of a single frame). The clock signal (DCLK) is a signal by which the gate and data drivers 122 and 123 are synchronized with the timing controller 121 thus to generate each type of signals. And, a data enable signal (DE) is a signal indicating a time duration for which a pixel voltage is supplied to the pixel electrode of the LCD panel 100.

Although not shown, the timing controller 121 is connected to an external system (not shown) through a prescribed interface, and rapidly and precisely receives image signal and a timing signal output from the external system.

As such interface, a low voltage differential signal (LVDS) interface, a transistor-transistor logic (TTL) interface, etc. may be used.

The gate driver 122 consists of a plurality of shift registers connected to the LCD panel 100 through the gate lines (GL).

Each shift register sequentially outputs gate driving signals (VG) to the gate lines (GL) one by one under control of the timing controller 121.

The gate driver 122 turns on the TFT arranged on the LCD panel 100 in response to the gate control signal (GCS) applied from the timing controller 121, so that a pixel voltage of an analog waveform supplied from the data driver 123 can be applied to an LC cell connected to each TFT.

The gate control signal (GCS) includes gate start pulse (GSP), gate shift clock (GSC), gate output enable (GOE), etc. The GSP is a signal for generating a first gate pulse by being applied to a shift register among a plurality of shift registers of the gate driver 110, the shift register which generates the first gate pulse. And, the GSC is a signal commonly applied to all shift registers, and is configured to shift GSP. And, the GOE is configured to prevent turn on of TFTs corresponding to different horizontal time periods and resulting from overlapping, by controlling output of shift registers.

In case of applying a gate overlapping driving method, the gate driver 122 is configured to supply a high-potential gate driving signal to the gate lines (GL), so that the gate lines can overlap each other at an interval of a single horizontal time period (1H), with a time period more than 2 horizontal time periods (2H).

The data driver 123 sequentially receives digital image signals (DATA) in correspondence to data control signals input from the timing controller 121, and converts the digital image signals into analog pixel voltages based on a reference voltage. The pixel voltages are simultaneously applied to the LCD panel 100 through all the data lines (DL), by being latched by a single horizontal time period (1H).

The data control signal (DCS) includes source start pulse (SSP), source shift clock (SSC), source output enable (SOE), etc. The SSP is a signal for controlling a data sampling start timing of a data driver 160. The SSC is a signal for controlling a data sampling timing at each driving IC of the data driver 160 in correspondence to a rising or falling edge. And, the SOE is a signal for controlling an output timing of the data driver 160.

The touch sensing circuit 124 is configured to sense whether a touch input has been performed on the LCD panel 100 by a touch control signal (TCS) applied from the timing controller 121, and to calculate coordinates values on the LCD panel 100. Such touch sensing circuit 124 may include a low pass filter (LPF), an A/D converter, a signal processor, a coordinates extractor, etc. The LPF serves to remove a high frequency component included in a sensing signal received from the sensing line of the touch block (TB) of the LCD panel 100, and to extract and output only a touch component. The ND converter serves to convert an analog signal output from the LPF, into a digital signal. The signal processor is a logic circuit for sensing whether the touch block (TB) has been touched in correspondence to an output signal of the A/D converter. And, the coordinates extractor is a logic circuit for calculating coordinates values if it is determined by the signal processor that the touch block (TB) has been touched.

The common voltage generator 125 is a circuit for supplying common signals (Vcom) to common lines (CL) of the LC panel 100. The common signal (Vcom) generated by the common voltage generator 125 has a first waveform of a fixed potential (in other words having a direct current (DC) waveform), which is applied to all the common lines for a display time period during which an image is displayed by the LCD panel 100.

On the contrary, for a touch time period, a common voltage (Vcom) of a second waveform, an alternating current (AC) waveform which swings between prescribes potentials, is sequentially applied to the common lines (CL) of the LCD panel 100.

The common voltage (Vcom) of a second waveform is applied to common lines (CL) of another touch block (TB) rather than a touch block (TB) to which high-potential gate driving signals are being currently applied through gate lines (GL), for a time period nearly the same as a single horizontal time period (1H). More specifically, the common voltage (Vcom) of a second waveform is applied to common lines (CL) of one of other touch blocks (TB) rather than a touch block (TB) to which a high-potential gate driving signal (VG) is being currently applied for charging.

As an example, if high-potential gate driving signals (VG) are being currently applied to gate lines (GL) of a first touch block (TB0), common voltages (Vcom) of a second waveform are applied to common lines (CL) of at least one of a plurality of touch blocks ($2^{nd}$ touch block (TB1)~$N^{th}$ touch block (N is natural number)), for a single horizontal time period (1H). In other words, if high-potential gate driving signals (VG) are being currently applied to gate lines (GL) of a first touch block (TB0), common voltages (Vcom) of a second waveform are applied to common lines (CL) of at least one of a plurality of touch blocks different from the first touch block (TB0).

Under this configuration, a voltage of a common electrode irrelevant to a currently-charged pixel electrode swings, and a touch input is sensed through sensing lines of the second touch block (TB1) having the common electrode. As touch sensing is implemented through spatial division, a touch time period and a display time period can overlap each other.

A terminal portion 130 for transmitting and receiving each type of signals by being electrically connected to an external system, is provided at one side end of the LCD panel 100.

Hereinafter, a pixel structure of the LCD panel in the LCD device according to the present invention will be explained.

Figure 5:
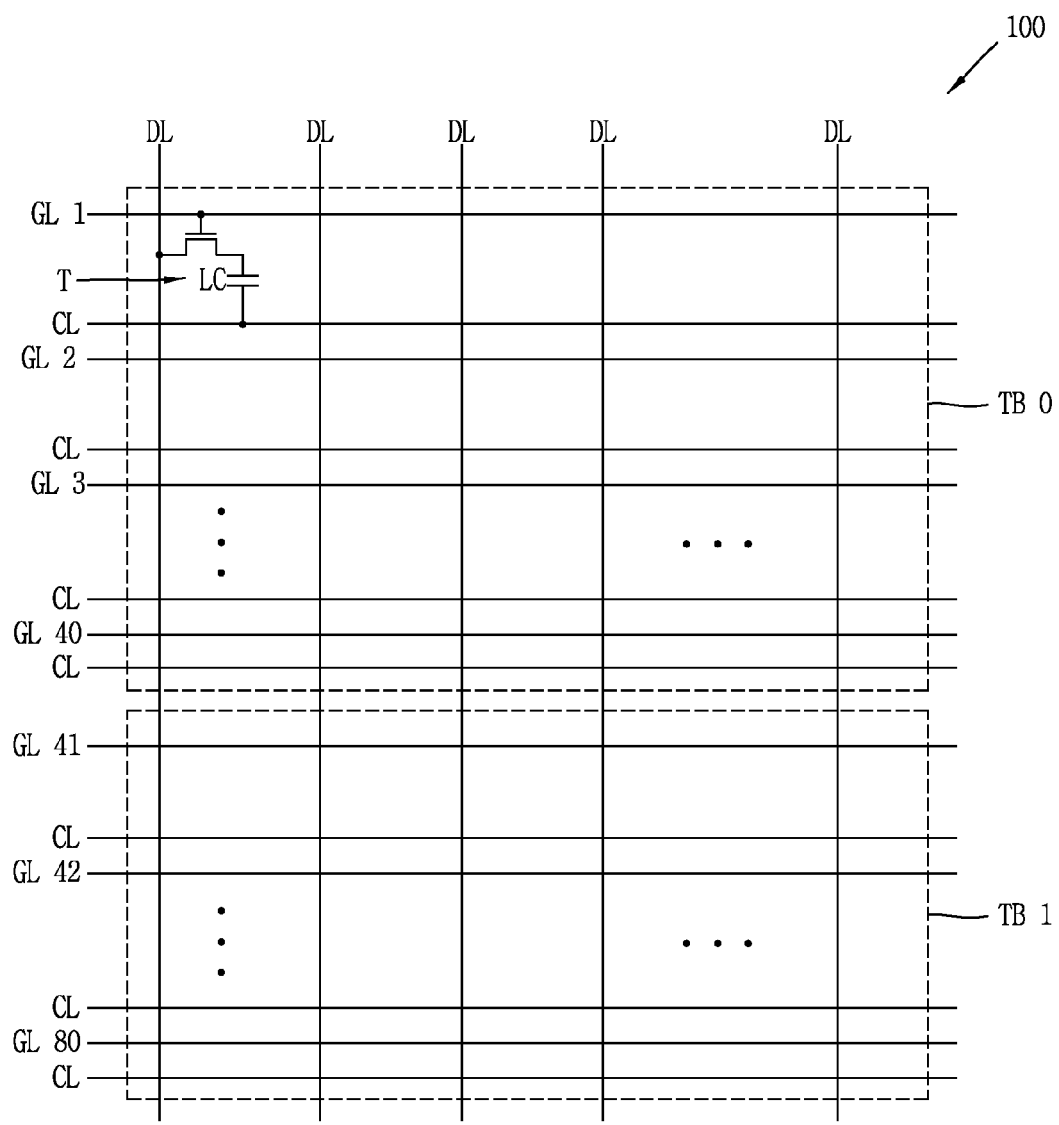
FIG. 5 is a view showing a structure of a pixel formed at a liquid crystal (LC) panel of an in-cell touch type LCD device according to the present invention.

FIG. 5 is a view showing a structure of a pixel formed at the liquid crystal display (LCD) panel of the in-cell touch type LCD device according to the present invention.

A plurality of gate lines (GL) and data lines (DL) are arranged in a matrix form on the LCD panel 100, and a plurality of pixels are formed at intersections. At each pixel, formed are a thin film transistor (T) serving as a switching device, and an LC cell connected to a drain electrode of the TFT.

The TFT (T) may be implemented as an n-channel metal oxide semiconductor (MOS) type of TFT. A source electrode is connected to a data line (DL), and a gate electrode is connected to a gate line (GL). The drain electrode is connected to one end of the LC cell (LC). One end of the LC cell (LC) is connected to the drain electrode of the TFT, and another end thereof is connected to a common line (CL).

One pixel is electrically connected to another pixel, on the same horizontal line of the LCD panel 100, through a gate lines (GL). The gate line (GL) is connected to the aforementioned gate driver 122 (refer to FIG. 3), and transmits a gate driving signal (VG) applied from the gate driver to a gate electrode of the TFT. Also, one pixel is electrically connected to another pixel, on the same vertical line of the LCD panel 100, through a data line (DL). The data line (DL) is connected to the aforementioned data driver 123 (refer to FIG. 3), and transmits a pixel voltage (Vdata) applied from the data driver 123 to a source electrode of the TFT.

Still also, one pixel is electrically connected to another pixel, on the same vertical line of the LCD panel 100, through a common line (CL). The common line (CL) is connected to the common voltage generator 125 (refer to FIG. 3), and applies a common signal (Vcom) generated from the common voltage generator 125 to a single electrode of the LC.

Gate lines (GL1~GL40) and pixels connected thereto are included in a first touch block (TB0), and gate lines (GL41~GL80) and pixels connected thereto are included in a second touch block (TB1). Although not shown, a plurality of touch blocks are further implemented subsequent to the second touch block (TB1).

Under the aforementioned configuration, the gate driver sequentially applies high-potential gate driving signals to the LCD panel, through the gate lines (GL), for the single horizontal time period. And, the data driver applies a pixel voltage to a pixel of a corresponding horizontal line. As a result, the LCD panel 100 displays a gray scale of an image one by one horizontal line. The common voltage generator applies a direct current (DC) common voltage (Vcom) of a first waveform to all the common lines (CL), but applies an alternating current (AC) common voltage (Vcom) of a second waveform to common lines (CL) of at least one touch block.

More specifically, the common voltage generator applies a high-potential gate driving signal to at least one of gate lines (GL) of the first touch block (TB0), thereby charging the LC cell (LC) of the pixel so that the first touch block (TB0) can be implemented for a display time period. At the same time, the common voltage generator applies a common voltage (Vcom) of a second waveform to common lines (CL) of the second touch block (TB1) or at least one of other touch blocks (than the first touch block (TB0)) (not shown), so that the corresponding touch block can be implemented for a touch time period. Accordingly, the in-cell touch type LCD device can be driven in a spatial division manner.

Figure 6:
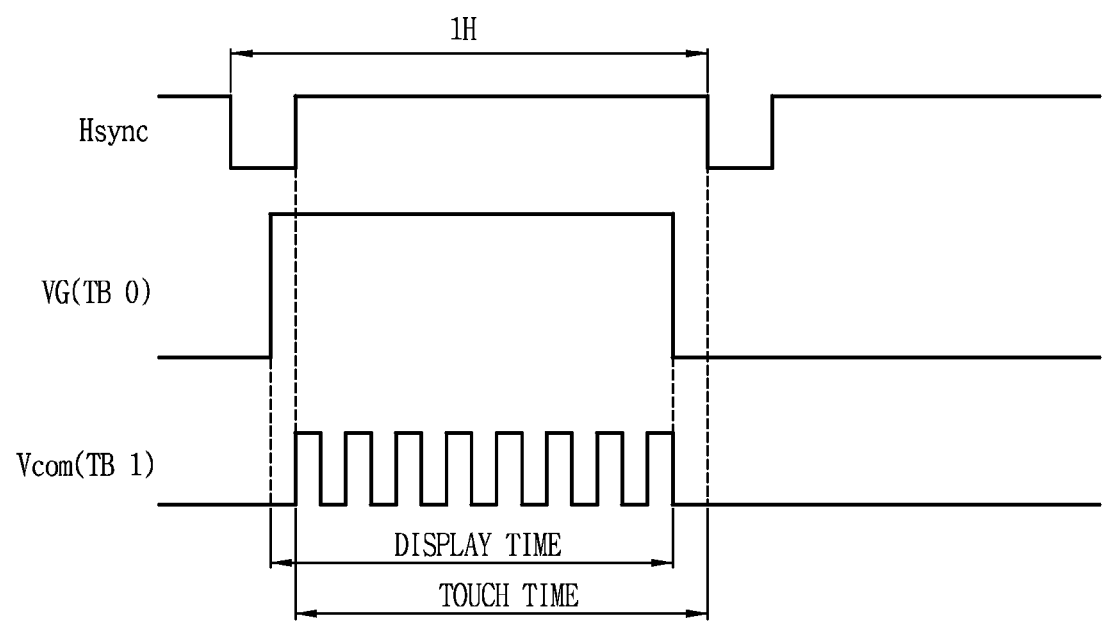
FIG. 6 is a view showing signal waveforms implemented when driving an in-cell touch type LCD device according to an embodiment of the present invention.

FIG. 6 is a view showing signal waveforms implemented when driving an in-cell touch type LCD device according to an embodiment of the present invention.

As shown, for a single time period of a horizontal synchronization signal (Hsync) which defines a single horizontal time period (1H), high-potential gate driving signals applied to gate lines of the first touch block (TB0) are allocated to a display time period. At the same time, second waveform common voltages (Vcom) which swing in an AC waveform, are allocated to a touch time period. This can allow a display time period and a touch time period to be sufficiently obtained without overlapping.

The high-potential gate driving signal may have a voltage level more than 20V, and the second waveform common voltage may have a voltage level for a swing operation within the range of 4.5V~−1.5V. And, the first waveform common voltage may have a fixed voltage level of −1.5V.

For instance, in case of an LCD device having a single horizontal time period (1H), a touch time period is allocated with 17 us and a display time period is allocated with 18 us, which is about 2 times of the conventional one. As a result, a pixel voltage is fully charged, and the touch time period is sufficiently long to increase touch sensitivity.

That is, the high-potential gate driving signal (VG) and the second waveform common voltage (Vcom) may have a time period corresponding to 70% or more of the single horizontal time period (1H).

Hereinafter, will be explained an LCD device which operates at a high frequency more than 120 Hz, by a gate overlap driving method for overlapping gate driving signals between neighboring gate lines so as to obtain a sufficient time for charging a pixel voltage.

Figure 7:
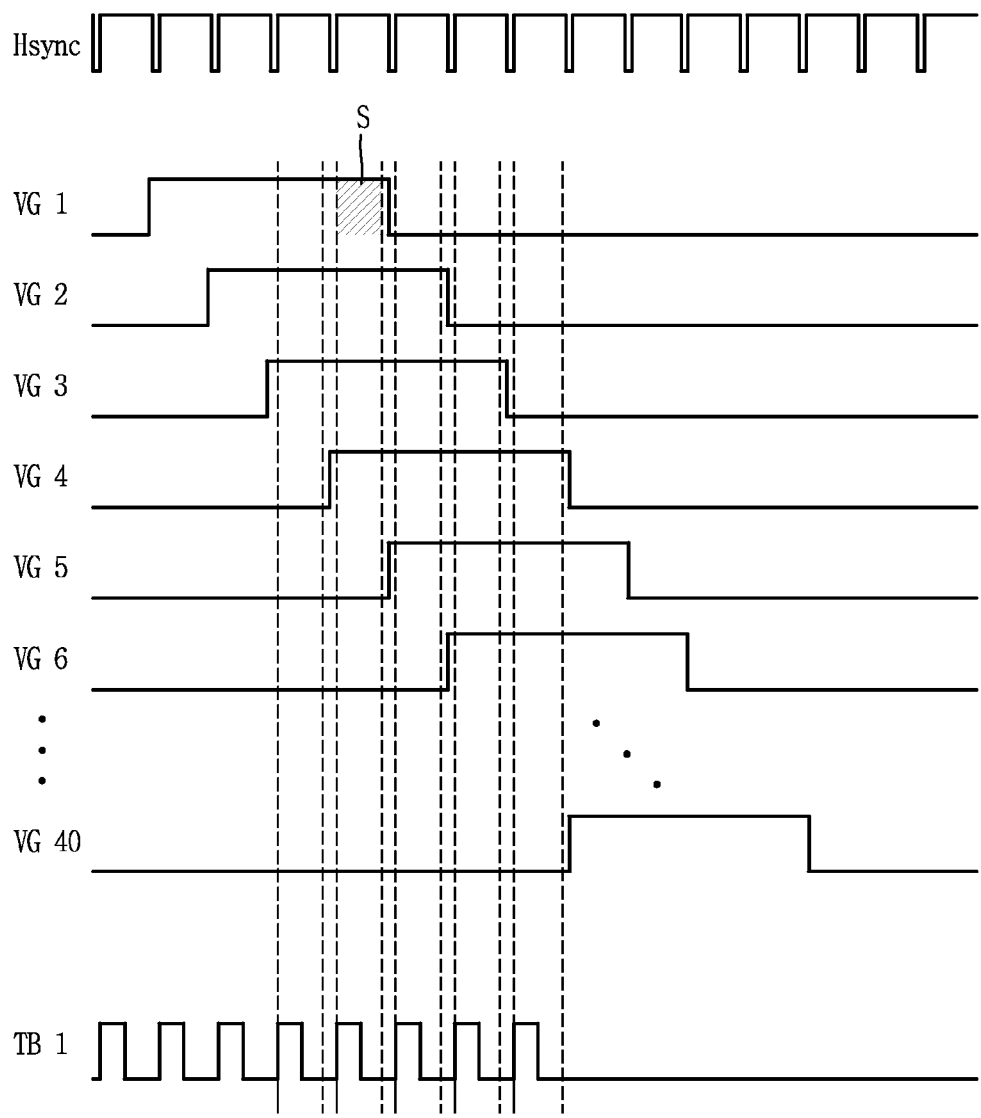
FIG. 7 is a view showing signal waveforms implemented when driving an in-cell touch type LCD device according to another embodiment of the present invention.

FIG. 7 is a view showing signal waveforms implemented when driving an in-cell touch type LCD device according to another embodiment of the present invention.

As shown, gate driving signals (VG1~VG40) of gate lines of the first touch block TB0 (refer to FIG. 5), are output as high-potential signals for 4 horizontal time periods (4H), by being synchronized with a horizontal synchronization signal (Hsync) which defines a single horizontal time period (1H). Then, the gate driving signals are shifted to a low potential. The neighboring gate driving signals {(VG1, VG2), (VG2, VG3)~(VG 39, VG40)} overlap each other for 3 horizontal time periods (3H). Pixel electrodes applied to the first touch block TB0 through data lines are supplied for a single horizontal time period (1H), which are applied only for a time period when the first gate voltage (VG1) and the fourth gate voltage (VG4) overlap each other.

At the same time, second waveform common voltages (Vcom) are applied to the second touch block (TB1). And, the second touch block (TB1) is synchronized with a second waveform common voltage (Vcom) which has swung as a 5nd high potential.

More specifically, the gate driving signal (VG) has a time period more than 2 horizontal time periods (2H). And, the high-potential $N^{th}$ gate driving signal (N is natural number), and the high-potential $N+1^{th}$ gate driving signal overlap each other for a single horizontal time period (1H). In such a manner, a gate overlap driving method can be applied to the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An in-cell touch type liquid crystal display (LCD) device, comprising:
    an LCD panel including:
        a first touch block including:
            a first set of gate lines; and
            a first set of common lines; and
        a second touch block including:
            a second set of gate lines; and
            a second set of common lines;
    a gate driver for sequentially applying a high-potential gate driving signal to the first set of gate lines of the first touch block and the second set of gate lines of the second touch block for a single horizontal time period;
    a common voltage generator for concurrently supplying common voltages (Vcom) of:
        a first waveform to all the first set of common lines and the second set of common lines for a display time period during which an image is displayed by the LCD panel; and
        a second waveform to the second set of common lines of the second touch block rather than the first touch block to which the high-potential gate driving signal is being currently applied through the first set of gate lines for detecting a touch input for a touch time period less than the single horizontal time period; and
    a touch detection circuit for detecting a touched position on the liquid crystal (LC) panel through the second waveform common voltages,
    wherein the first waveform common voltage is a direct current (DC) common voltage corresponding to a pixel voltage of a pixel provided at the LC panel,
    wherein the second waveform common voltage is an alternating current (AC) common voltage including multiple repetitive square waveforms within the touch time period,
    wherein, within the single horizontal period, the high-potential gate driving signal partially overlaps and precedes the second waveform common voltage, and
    wherein the second waveform common voltage swings at constant intervals.

2. The in-cell touch type LCD device of claim 1, wherein the high-potential gate driving signal and the second waveform common voltage overlap with each other for a time period of at least 70% of the single horizontal time period (1H).

3. The in-cell touch type LCD device of claim 1, wherein:
    the high-potential gate driving signal has a time period more than 2 horizontal time periods (2H); and
    an $n^{th}$ high-potential gate driving signal and an $n+1^{th}$ high-potential gate driving signal overlap each other for the single horizontal time period (1H).

4. A method for driving an in-cell touch type liquid crystal display (LCD) device including an LCD panel including a first touch block, including a first set of gate lines and a first set of common lines, and a second touch block, including a second set of gate lines and a second set of common lines, the method comprising:
    sequentially applying a high-potential gate driving signal to the first set of gate lines of the first touch block and the second set of gate lines of the second touch block for a single horizontal time period; and
    concurrently applying common voltages (Vcom) of:
        a first waveform to all the first set of common lines and the second set of common lines for a display time period during which an image is displayed by the LCD panel; and
        a second waveform to the second set of common lines of the second touch block, rather than the first touch block to which the high-potential gate driving signal is being currently applied through the first set of gate lines for detecting a touch input for a touch time period less than the single horizontal time period,
    wherein the first waveform common voltage is a direct current (DC) common voltage corresponding to a pixel voltage of a pixel provided at the liquid crystal (LC) panel,
    wherein the second waveform common voltage is an alternating current (AC) common voltage including multiple repetitive square waveforms within the touch time period, and wherein, within the single horizontal time period, the high-potential gate driving signal partially overlaps and precedes the second waveform common voltage.

5. The method of claim 4, wherein the high-potential gate driving signal and the second waveform common voltage overlap with each other for a time period of at least 70% of the single horizontal time period (1H).

6. The method of claim 4, wherein:
the high-potential gate driving signal has a time period more than 2 horizontal time periods (2H); and
an $n^{th}$ high-potential gate driving signal and an $n+1^{th}$ high-potential gate driving signal overlap each other for the single horizontal time period (1H).

7. The in-cell touch type LCD device of claim 1, wherein the first waveform is also applied to the first touch block while the second waveform is applied to the second touch block.

8. The method of claim 4, wherein the first waveform is also applied to the first touch block while the second waveform is applied to the second touch block.

\* \* \* \* \*